United States Patent

[11] 3,561,708

| [72] | Inventors | George A. Dubey |
| | | Branford; |
| | | Edwin C. Taylor, New Haven, Conn. |
| [21] | Appl. No. | 800,187 |
| [22] | Filed | Feb. 18, 1969 |
| [45] | Patented | Feb. 9, 1971 |
| [73] | Assignee | MIF Industries, Inc. |
| | | Branford, Conn. |

[54] MULTIPURPOSE CABLE CLAMP
7 Claims, 9 Drawing Figs.

[52] U.S. Cl. .................................................. 248/63,
174/41, 248/65
[51] Int. Cl. ................................................... F16l 3/06
[50] Field of Search .......................................... 248/65, 63,
67.5, 67.7, 61, 66; 174/41, 40 (Cursory)

[56] References Cited
UNITED STATES PATENTS
2,334,560  11/1943  Kennedy .................. 248/67.5
2,901,798  9/1959  Jenne .......................... 248/65X
2,979,299  4/1961  Huggins ....................... 248/67.5

*Primary Examiner*—Chancellor E. Harris
*Attorney*—Mattern, Ware and Davis

ABSTRACT: A multipurpose pole line clamp for clamping utility cables and for supporting service drops. The clamp comprises a bearing member and a clamp member. The bearing member is provided with a tapped hole engaging a throughbolt extending through the utility pole. The clamp member is provided with an enlarged through hole to facilitate clamping it on the throughbolt with ease of assembly. Facing surfaces of the bearing and clamp members cooperate to anchor a messenger cable. The bearing member includes a saddle-horn-shaped stanchion for transferring to the pole the tensile load of a secondary messenger cable supporting the service drop line.

INVENTORS
GEORGE A. DUBEY
EDWIN C. TAYLOR

BY *Matson Ware & Davis*

ATTORNEYS

PATENTED FEB 9 1971 3,561,708

*INVENTORS*
GEORGE A. DUBEY
EDWIN C. TAYLOR

BY *Mattern Ware & Davis*

ATTORNEYS

MULTIPURPOSE CABLE CLAMP

BACKGROUND OF THE INVENTION

This invention relates to pole line clamps for utility cables, and more particularly to a multipurpose pole-line clamp for clamping the utility cable to a pole and providing support for a service drop line.

Utility cables generally comprise a messenger cable plus several power-conducting cables. The power cables are bound to the messenger cable by heavy binding wire, which supports and restrains the power cables against swinging or sagging. At utility poles, the messenger is separated from the other cables and fixed in a clamp secured to the utility pole.

In order to carry electrical power to customers, a service drop is provided, generally at a utility pole. A secondary group of power-conducting cables is spliced respectively into each main cable to deliver power to the user. In conventional installation procedures, a second messenger cable, which supports the second group of power-conducting cables, is connected to a thimble eyebolt or to a thimble eyenut or eyelet which is fixed to a throughbolt extending through the utility pole. The eyenut transmits the tensile load of the messenger cable to the pole through the bolt which attaches the eyenut to the pole. Lashing wires around the secondary messenger cable and its associated conductors prevents significant swinging or sagging of the conductors between the pole and the user. Service drops are also made where a group of users are located away from the main conductor cables. In both types of service drops, electrical power is drawn from the main conductors by spliced secondary conductors supported by a secondary messenger cable.

Service drops are often known in the utility industry as "takeoffs." A takeoff at a 90° elevation angle, with secondary messenger cable dead-ended at a right angle to the pole, produces a first set of forces in the eyenut, more or less evenly distributed via the threads around the periphery of the nut-retaining throughbolt, and placing the bolt in tension with minimum bending. A more nearly vertical acute elevation angle "takeoff" produces another set of forces, with a large downward shearing force component tending to bend the throughbolt. In order to avoid eyenut shearing caused by these different tensile load conditions, the eyenut or eyelet is generally overdesigned, using excess material to provide sufficient structural strength.

When installing service drops with an eyenut, two pole installations are required. One is the clamp, while the second is the eyenut. Two distinct holes must be drilled through the utility pole and two separate throughbolt installations must be made by the lineman, and thus the installation time required for mounting the two separate pieces of pole line hardware is significant and consequently expensive.

Briefly, conventional messenger cable installation procedure comprises the following steps: first, a throughbolt is inserted through the utility pole and the clamp members are loosely assembled thereon; next, the messenger cable is separated from the conductor cables over a short length near the pole, and is inserted between a bearing member and a clamp member; then the bearing and clamp members are drawn together by tightening the bolt with an associated nut bearing against the clamp member, securing the messenger cable within the clamp and anchoring the clamp to the pole. Before the messenger cable is secured in a conventional clamp, it may slip from between the bearing and clamp members, requiring retrieval and making the installation more time consuming and the procedure frustrating.

Accordingly, a principal object of the cable clamps of the present invention is to support service drop lines which include messenger and conductor cables.

Another object of the present invention is to transmit the tensile load of the messenger cable used for the service drop to a utility pole.

A further object of the present invention is to provide apparatus facilitating easy and quick installation of a multipurpose pole-line clamp, anchoring utility cables and supporting service drop lines with a single assembly at each pole.

Still another object of the present invention is to provide a pole-line clamp and service drop connector attachable to a utility pole with only one throughbolt.

A further object of the present invention is to provide a multipurpose pole-line clamp and service drop connector stanchion with the service drop connector stanchion being capable of supporting up to 5,000 pounds of tensile load.

Still another object of the present invention is to provide a service drop connector stanchion adapted to accommodate takeoff loads at many different elevation angles from 90° takeoff angles through increasingly acute takeoff angles, and at any azimuth angle radially from the pole centerline.

Another object of the present invention is to retain a messenger cable positioned between bearing and clamp members of a clamp assembly while the members are being drawn together, preventing inadvertent release of the cable until it is firmly clamped against movement relative to the clamp assembly.

In accordance with the principles of the present invention, the foregoing objects are accomplished by providing a multipurpose pole-line clamp which clamps utility cables and supports a customer service drop. The multipurpose clamp incorporates a clamp member having a clamping surface, a bearing member having a bearing surface and a saddle-horn-shaped stanchion. The bearing and clamp members are arranged so that the clamping surface is in juxtaposed relationship with the bearing surface, and the two surfaces cooperate to clamp a utility cable therebetween when the bearing and clamp members are assembled and drawn together. The stanchion simultaneously transmits the tensile load of the service drop to the utility pole to which the multipurpose clamp is secured.

As in the prior art, the method employed for drawing and securing the bearing and clamp members together is to provide each member with a bolt hold and to drill a throughbolt-receiving hole through the utility pole so that a throughbolt can be installed on the pole to enable the bearing and clamping members to be assembled thereon and drawn together or to be moved apart by manipulating the clamp members and throughbolt and its associated nut.

During installation, the multipurpose clamp of the present invention is initially secured loosely to the utility pole by means of a bolt extending through the hole in the pole. The threaded hole of the bearing member permits its threaded engagement on the bolt, and the lineman can spin the bearing member into its pole-abutting position. By turning the bolt, the bearing member is drawn into seated or embedded position on the pole surface. The clamp member is separated far enough from the bearing member to permit the messenger cable to be placed between the cooperating surfaces of the bearing and clamp members for permanent installation. The nut threaded on the bolt is then tightened to secure the messenger cable against lengthwise movement.

In accordance with a principle of the present invention, the bolt hole in the bearing member is threaded and will cooperate with a threaded throughbolt to draw the bearing member into abutting relationship with the pole. The bearing member is anchored against the pole in an upright fashion by manipulating the throughbolt from the rear of the pole. The clamp member may loosely fit on the throughbolt and be drawn to the secured bearing member by a nut to hold the messenger cable, preventing lengthwise movement.

In accordance with another feature of the present invention, the bearing member incorporates protruding fingers for holding the messenger cable while the bearing and clamp members are drawn together. When the fingers are used with a bearing member including a threaded bolt hold and the bearing member is secured to the pole, the fingers extend outward and slightly upward when the bearing member is mounted against the pole and thus hold the messenger cable against inadvertent release.

In accordance with still another feature of the present invention, the saddle-horn-shaped stanchion is contoured to provide a type of overturning action, pivoting the bearing member about the throughbolt when the secondary messenger cable is connected to the stanchion, thus imbedding the bearing member even more firmly into the pole to resist downslotting. In order to achieve the pivoting action, a slight clearance may be provided between the bolt hole in the bearing member and the throughbolt. A slight pivoting action may also be provided by slight play or clearance between the threads of the bolt hold in the bearing member and the throughbolt. This pivoting action causes extra pressure to be exerted under all takeoff load conditions by the lower portion of the bearing member which abuts the utility pole, insuring against downslotting of the clamp assembly. Since the connecting stanchion is located at the top of the bearing member, the bearing member itself serves to support vertical "takeoff" loads, and both a "90°" "takeoff" and takeoffs at acute angles more nearly vertically oriented can be supported without requiring the overdesign and excess weight of the prior art. Further, the pivoting action of the multipurpose clamp of the present invention permits an excellent force distribution of the secondary messenger cable tensile load among the supporting portions of the clamp assembly.

Upper and lower portions of the bearing member are adapted to abut against the utility pole. Both portions may include prongs for anchoring the bearing member in the utility pole, further resisting downslotting of the clamp assembly.

THE FIGURES

DETAILED DESCRIPTION

Figure 1:
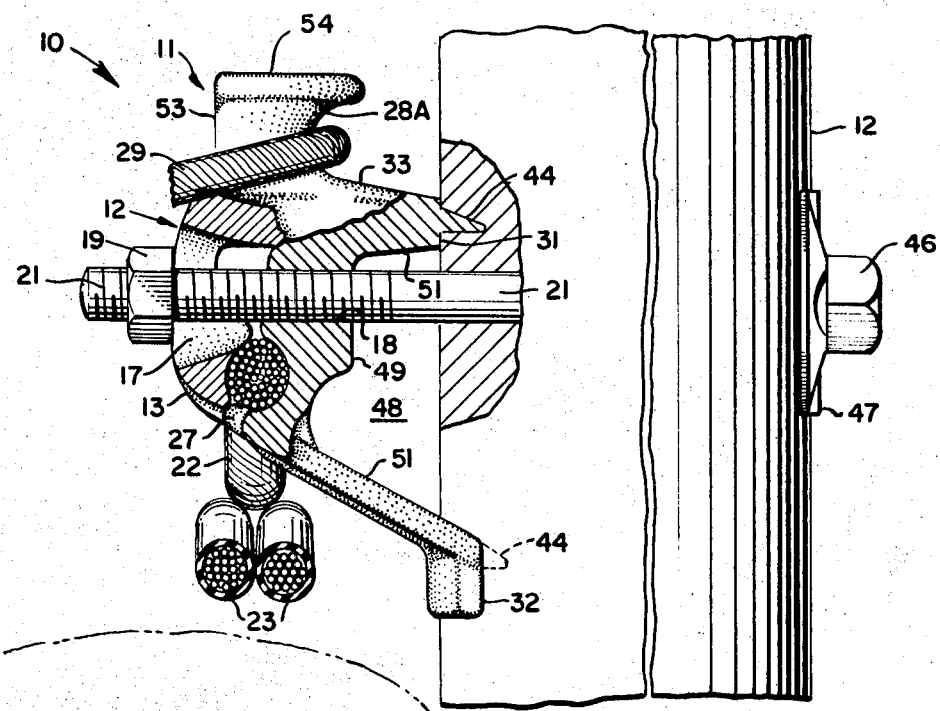
FIG. 1 is an end elevation view of the multipurpose clamp of the present invention with a secondary messenger cable connected thereto.
Figure 2:
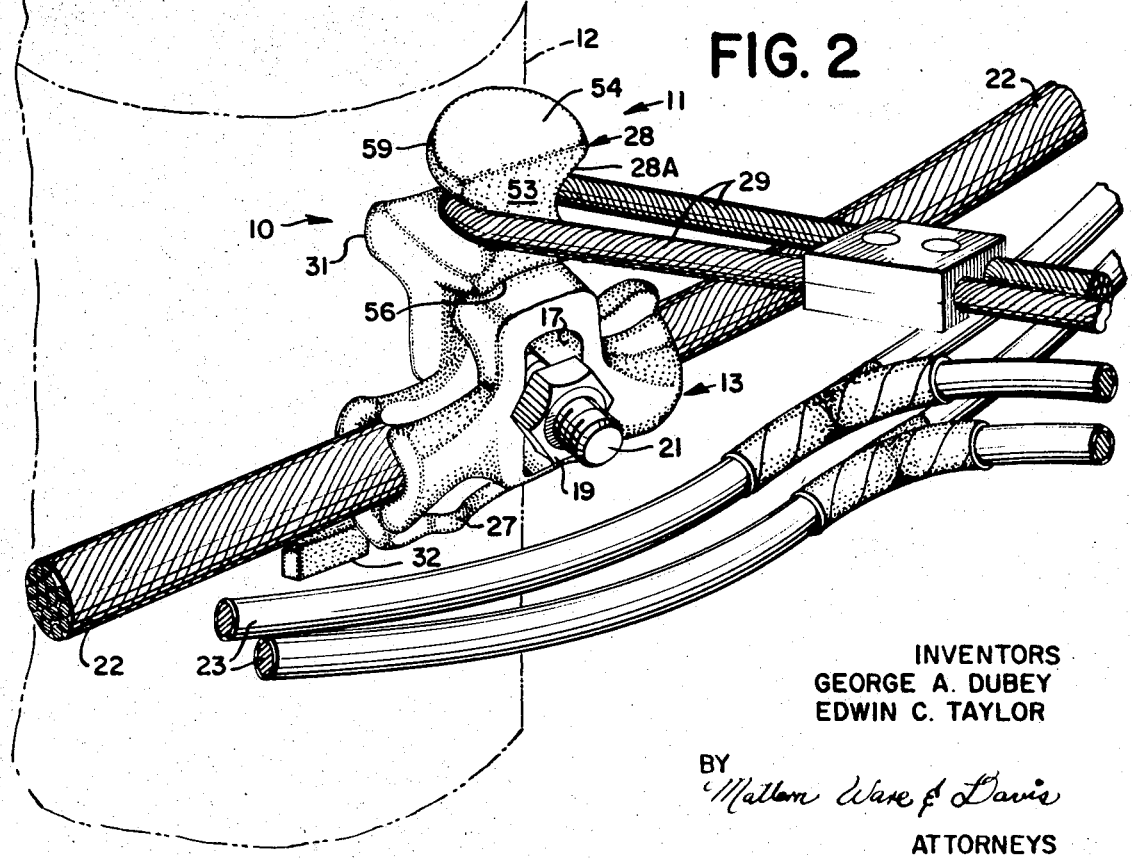
FIG. 2 is a front perspective view of the multipurpose clamp of the present invention with the secondary messenger cable connected thereto.

The multipurpose clamp assembly shown in the FIGS. generally as 10 comprises a bearing member 11 adapted to abut against a utility pole 12, and an associated clamp member 13. Lower portion 14 of the rear surface of clamp member 13 overlies a segment of the midportion 16 of the front surface of bearing member 11. An enlarged bolt hole 17 extending through the middle of clamp member 13 is aligned with a threaded bolt hole 18 extending through the middle of bearing member 11. A bolt 21 extends through the pole 12 and through bolt holes 17 and 18, in threaded engagement with bearing member 11, to receive a nut 19 threaded on the protruding end of bolt 21, and bearing against the md midportion of the front surface of clamp 13, in its torqued-on, installed position.

Utility cables generally comprise a messenger cable 22 and associated conducting cables 23, bound together for example by helically wound binding wire of aluminum or other weather resistant metal. At each utility pole clamp, messenger cable 22 is separated somewhat from its conductors and securely anchored between two facing surfaces 14 and 16 on clamp and bearing members 13 and 11, respectively. Surfaces 14 and 16 are concave, endwise-extending messenger receiving grooves, preferably flared at each end to accommodate moderate amounts of messenger cable sag and pole-line curvature. When nut 19 is loosened, before the messenger cable 22 is fixed in the clamp, clamp member 13 is capable of free movement relative to bearing member 11, including pivoting movement about an endwise-extending fulcrum ridge 25, located on the upper portion of the front surface of bearing member 11, cooperating with an endwise-extending groove 24, located spanning the upper portion of the rear surface of clamp member 13. Bolt-hole 17 of clamp member 13 is significantly larger than the diameter of bolt 21 to permit this pivoting action and to aid in the manipulation of clamp member 13 to accommodate messenger cable 22 inserted between facing surfaces 14 and 16 of clamp and bearing member 13 and 11 respectively.

While the clamp member 13 is being drawn toward bearing member 11 by action of nut 19 bearing against the front surface of clamp member 13, the messenger cable 22 is supported by a pair of fingers 27 extending outward from the lower front surface of bearing member 11, at the lower edge of messenger receiving groove 16. Significant installation time may be saved, in accordance with the this feature of the present invention, since the messenger cable 22 often slips from between the facing surfaces while the clamp member 13 is being drawn to the bearing member 11. In order to maximize the holding action of fingers 27, bolt hole 18 is threaded, and bearing member 11 is thus held securely to the pole by threaded bolt 21, while clamp member 13 is manipulated.

In accordance with another feature of the present invention, bearing member 11 which may be a solid, sturdy, unitary casting of malleable cast iron, for example. Bearing member 11 incorporates a saddle-horn-shaped stanchion 28 protruding upward from its upper portion. The service knob or stanchion 28 preferably has flat top and front surfaces, and is concavely curved in a saddle surface 28A around its side and back forming an upright neck around which the eye loop of a secondary messenger cable 29 is secured. The tensile load of the secondary messenger cable 29, which may be as much as 5,000 pounds, is transmitted through stanchion 28 and bearing member 11 to pole 12 through bolt 21. Further, bearing member 11 abuts pole 12 at upper and lower pads 31 and 32, respectively projecting towards pole 12 from the rear surface of the bearing member 11. Pads 31 and 32 also serve to transmit to the pole 12 the downward component of the tensile load of secondary messenger cable 29 to the pole 12. The pivoting action of bearing member 11 about bolt 21 cooperating with bolt hole 18 causes the lower abutting pad 32 to embed into pole 12 while the upper abutting portion 31 tends to be drawn away from the pole. This extra pressure at the lower abutting portion 31 prevents the clamp from "downslotting" or slipping down the pole.

For a 90° elevation angle takeoff at 90° azimuth plane, stanchion 28 should be capable of carrying up to 5,000 pounds of tensile load exerted by the secondary messenger cable 29. By forming stanchion 28 and bearing member 11 as a unitary structure, the bearing member 11 is itself aids in transmitting the vertical component tensile load of secondary messenger cable 29 when the takeoff is at an acute angle.

The foregoing description briefly sets forth the operation of the present invention. For a fuller understanding of the invention, there follows a detailed description of the separate bearing and clamp members 11 and 13, respectively.

BEARING MEMBER

Figure 3:
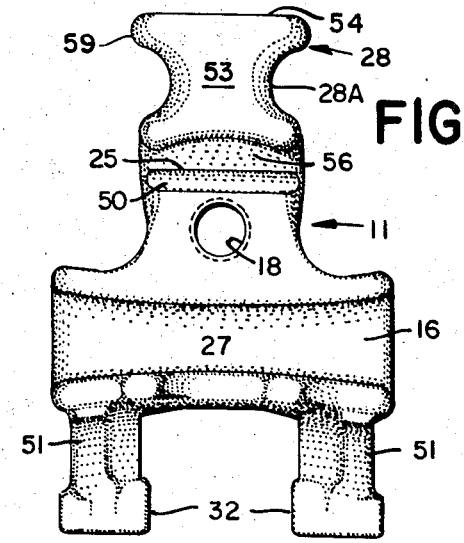
FIG. 3 is a front view of the bearing member of the present invention.
Figure 4:
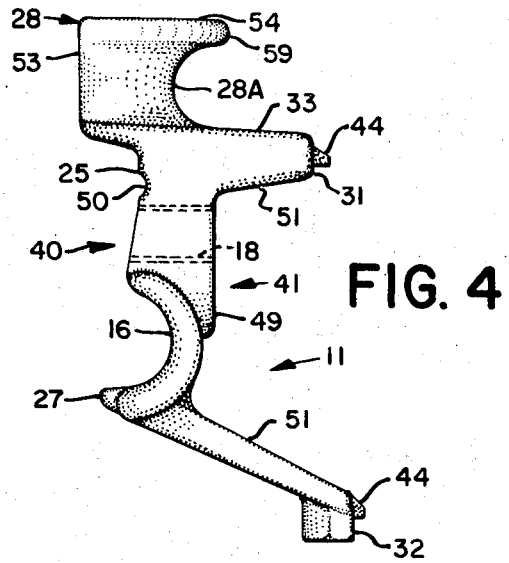
FIG. 4 is an end view of the bearing member.
Figure 6:
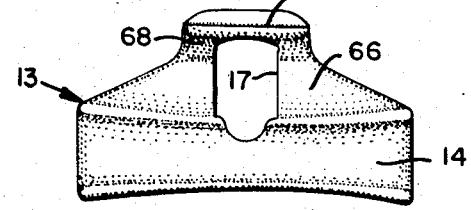
FIG. 6 is a rear view of the clamp member of the present invention.
Figure 5:
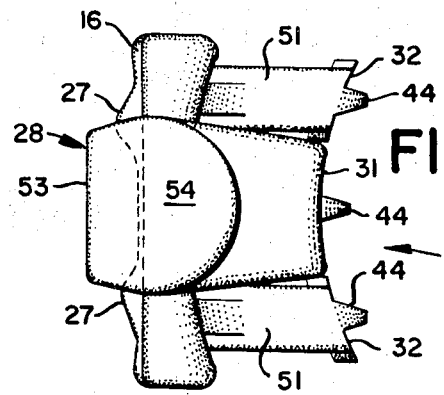
FIG. 5 is a top view of the bearing member.
Figure 7:
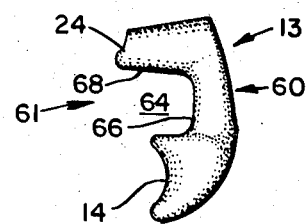
FIG. 7 is an end view of the clamp member.
Figure 9:
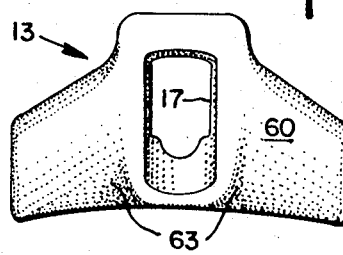
FIG. 9 is a front view of the clamp member.
Figure 8:
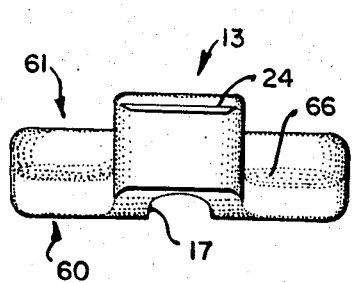
FIG. 8 is a top view of the clamp member.

FIGS. 3 through 5 present the front, end and top views, respectively, of bearing member 11, which generally comprises a front surface 40 and a rear surface 41. Rear surface 41 is provided with upper and lower rearwardly extending pole-engaging pad portions 31 and 32 transversely curved at their rearward surfaces 43 to substantially conform to the circumferential surface of pole 12 to which the bearing member 11 is adapted to be attached. Prong projections 44 extending outwardly from the pad portions 31 and 32 towards pole 12 are utilized to imbed bearing member 11 into a wood pole. For installations on concrete or steel utility poles, prongs 44 will not be utilized, and may be omitted.

Bearing member 11 is provided centrally with a throughbolt-receiving threaded hole 18 for engagement by the projected threaded end of throughbolt 21 extending diametrically through the pole 12. The opposite end of the throughbolt has a head 46 as seen in FIG. 1 engaging a curved bearing washer 47 interposed between the head 46 and the pole. It will be understood that instead of a head 46, the opposite end of the throughbolt 21 may be threaded and have a nut screwed thereon.

The hole 18 in the body of bearing member 11 opens into a recess 48 defined by a rear wall segment 49 of the midportion of the rear surface 41, and by the facing surfaces 51-51 of polewardly extending pad portions 31 and 32, so that wall segment 49 is outwardly offset, spaced away from the pole surface. Significant weight is saved by providing this recess 48 between wall segment 49 and pole 12. The bearing member 11 is secured on the pole with its prong projections 44 imbedded therein through the turning of the throughbolt 21 from the rear of the pole by engaging a wrench with the head 46, or through tightening of the rear nut upon the threaded rear-end of the bolt if head 46 is replaced by a threaded nut not shown in the drawings.

The facing surfaces 51 merge into the midwall segment 49 of the rear surface 41 of bearing member 11, and the upper portion of the midsegment 49 includes hole 18.

Viewed from the front, surface 40 of bearing member 11 is concavely curved at its bottom portion to receive the messenger cable 22, forming the endwise-extending shallow messenger groove 16. The front surface 40 is also provided with an upper endwise-extending groove 50 of substantially semicircular cross section surmounted by a fulcrum ridge 25 forming the upper edge of groove 50, to position and cooperate with a mating fulcrum groove 24 formed in clamp member 13. Fingers 27 extend outward from the lower edge of front surface 40 of bearing member 11, just beneath messenger groove 16, to hold messenger cable 22 temporarily while clamp member 13 is being drawn to bearing member 11. When bearing member 11 is secured to pole 12 and prongs 44 are imbedded therein, fingers 27 extend outwardly and slightly upwardly to support messenger cable 22 during the clamping operation.

The stanchion 28 is part of the unitary bearing member 11 and protrudes from the upper portion thereof. It incorporates a substantially flat front surface 53, a flat top surface 54 meeting front surface 53 along a front upper edge, and a bottom surface 56 meeting front surface 53 along a rounded edge and extending rearward and then downward in a fillet to meet fulcrum ridge 25, which is just above groove 50 in the front surface 40 of bearing member 11. By extending bottom surface 56 downward from front surface 53 to fulcrum ridge 25, clearance is provided for the clamp member 13 to pivot about fulcrum ridge 25. Surface 56 is concavely curved, being arched upward to provide further clearance for clamp member 13 while pivoting. A saddle surface 28A bounds the sides and rear of stanchion 28, flaring out towards the topmost surface 54 to form a secondary messenger-retaining flange 59, restraining the secondary messenger cable 29 against sudden disengagement. The lower portion of saddle surface 28A also flares outward to merge into a top surface 33 which extends poleward to terminate in upper pad 31. The smooth unbroken saddle shape of the saddle surface 28A of stanchion 28 combines with the smooth merger between this surface and the topmost surface 54 and surface 33 to provide a smooth seat for secondary messenger cable 29, free of sharp corners for sliding contact of the secondary messenger cable 29 while it is being installed and held by stanchion 28, and when shock or wind loads produce shifting or oscillation of cable 29. This smooth stanchion surface permits secondary messenger 29 to be installed at any azimuth angle over a range of 180°.

CLAMP MEMBER

FIGS. 6 through 9 present views of the clamp member 13 comprising generally a front surface 60 and a rear surface 61.

Front surface 60 is substantially curved away from pole 12 at its center and toward pole 12 at its upper and lower portions. A substantially oval bolt hole 17 tapered towards pole 12 is provided through the center of clamp member 13 extending from the front to the rear surfaces. By providing a larger opening at the front surface 60 than at the rear surface 61, pivoting action may be achieved with groove 24 of clamp member 13 riding on fulcrum ridge 25 of bearing member 11. Slight depressions 63-63 are located in the front surface on either side of the lower portion of bolt hole 17 and facilitate its manipulation by the lineman.

The clamping surface 14 of clamp member 13 is located at the bottom of the rear surface 61. It is concavely curved to form an endwise-extending, shallow, messenger-receiving groove 14 to cooperate with bearing surface 16 and define a substantially cylindrical zone extending across clamp 10 for holding the messenger cable 22. The hole 17 opens to a recess 64 defined by the upper rim of surface 14, a rear surface 66 in the middle of rear surface 61, and an upper surface 68 merging into the roof of hole 17 and extending towards the pole 12. Fulcrum groove 24 faces outwardly towards the pole from the rearmost portion of surface 68 to accommodate fulcrum ridge 25 of bearing member 11.

In conventional clamp assemblies, separate clamp members and service drop connectors require two separate installations. The present invention permits one installation of only one throughbolt and one hardware assembly for both the clamping and service drop functions, saving significant installation time. Stanchion 28 is saddle-horn-shaped to hold secondary messenger cable and provide overturning, embedding action resisting downslotting of bearing member 11, while effectively transmitting the tension load of secondary connector 29 to pole 12. Up to 5,000 pounds of tensile load on the secondary messenger cable can be carried by the multipurpose clamp assembly of the present invention. Still further time is conserved by fingers 27 which hold the messenger cable 22 while the clamp member is being drawn to the bearing member. This holding action is most effective if the bolt-hole 18 of bearing member 11 is threaded to receive threaded throughbolt 21.

Since the foregoing description and drawings are merely illustrative, the scope of the invention has been more broadly stated herein; and it should be liberally interpreted so as to obtain the benefit of all equivalents to which the invention is fairly entitled.

We claim:

1. A multipurpose clamp for anchoring a utility line messenger cable to a utility pole and for deadending a service drop messenger cable simultaneously, comprising:
 A. a bearing member adapted to abut against a utility pole and comprising;
  1. a hub portion having a horizontal throughbolt receiving passage therethrough,
  2. a top surface upwardly spaced from said passage,
  3. a forward bearing surface to which the forward end of said passage opens, having a first messenger cable-receiving groove spaced below the forward end of said passage,
  4. a rearward pole-engaging surface to which the rearward end of said passage opens and including upper and lower pole-engaging pad means respectively spaced above and below the rearward end of said passage, and
  5. an upright stanchion integrally supported on said top surface in forwardly spaced relation to said rearward pole-engaging surface and rising above the horizontal plane of said upper pad means, and having a second messenger cable loop-receiving saddle-shaped groove extending about its rearward face along opposite sides to its forward face;
 B. a clamp member including an upper fulcrum portion for fulcrum engagement with said forward surface of said bearing member above the forward end of said passage and having a messenger receiving groove for facing juxtaposition with said first messenger cable-receiving groove of said bearing member; and C. clamping means for anchoring the clamp member and the bearing member together against the utility pole.

2. The clamp as defined in claim 1, wherein the clamping means includes:

A. said throughbolt receiving passage forming a first throughbolt hole, extending poleward through the bearing member;

B. means forming a second throughbolt hole extending poleward through the clamp member;

C. a throughbolt extending through the utility pole and the first and second bolt holes; and D. nut means cooperating with the throughbolt to draw the bearing member and the clamp member together.

3. The clamp as defined in claim 1, wherein the bearing member pad means further includes prong means to be imbedded in the utility pole.

4. The clamp defined in claim 2, wherein the first throughbolt hole is threaded for engagement with the threaded end of the throughbolt protruding from the pole surface.

5. The clamp defined in claim 2, wherein the second throughbolt hole is larger than the diameter of the throughbolt to facilitate rocking pivoting manipulation of the clamp member for installation of the first messenger cable.

6. The clamp defined in claim 2, wherein the first throughbolt hole is sufficiently larger than the diameter of the throughbolt to permit rocking embedment of the bearing member under loads applied in directions away from the pole by the second messenger cable to the stanchion.

7. The clamp defined in claim 1, wherein the bearing member is provided with messenger supporting finger means protruding therefrom beneath the first messenger cable-receiving groove in a direction away from the pole surface, providing temporary messenger support during manipulation of the clamp assembly.